United States Patent
Huang et al.

(10) Patent No.: US 10,521,052 B2
(45) Date of Patent: Dec. 31, 2019

(54) 3D INTERACTIVE SYSTEM

(71) Applicant: Synaptics Incorporated, San Jose, CA (US)

(72) Inventors: Yi-Pai Huang, Taipei (TW); Xuan Li, Taipei (TW); Yi-Chun Hsu, Taipei (TW); Chun-Ho Chen, Taipei (TW)

(73) Assignee: Synaptics Incorporated, San Jose, CA (US)

( * ) Notice: Subject to any disclaimer, the term of this patent is extended or adjusted under 35 U.S.C. 154(b) by 144 days.

(21) Appl. No.: 15/665,015

(22) Filed: Jul. 31, 2017

(65) Prior Publication Data

US 2019/0034029 A1    Jan. 31, 2019

(51) Int. Cl.
| | |
|---|---|
| G06F 3/041 | (2006.01) |
| G06F 3/042 | (2006.01) |
| G06F 3/03 | (2006.01) |
| G06T 7/593 | (2017.01) |
| G06F 3/01 | (2006.01) |
| G06F 3/044 | (2006.01) |
| G06T 7/73 | (2017.01) |

(52) U.S. Cl.
CPC ............ *G06F 3/0418* (2013.01); *G06F 3/017* (2013.01); *G06F 3/0304* (2013.01); *G06F 3/0421* (2013.01); *G06F 3/0425* (2013.01); *G06F 3/0428* (2013.01); *G06T 7/593* (2017.01); *G06T 7/74* (2017.01); *G06F 3/044* (2013.01); *G06F 2203/04101* (2013.01); *G06F 2203/04106* (2013.01); *G06T 2207/10048* (2013.01)

(58) Field of Classification Search
USPC ........................................................ 345/175
See application file for complete search history.

(56) References Cited

U.S. PATENT DOCUMENTS

| | | | |
|---|---|---|---|
| 2003/0071119 A1* | 4/2003 | Tsikos .................... | G02B 26/10 235/434 |
| 2007/0269202 A1* | 11/2007 | Forsyth-Martinez ....... | G03B 11/00 396/429 |
| 2008/0088593 A1* | 4/2008 | Smoot ................... | G06F 3/0425 345/173 |
| 2009/0309844 A1* | 12/2009 | Woo ........................ | H01J 11/12 345/173 |
| 2012/0128330 A1* | 5/2012 | Mahdavi ............... | G06K 9/2018 386/252 |
| 2013/0088462 A1* | 4/2013 | So ........................... | G06F 3/042 345/175 |
| 2013/0141327 A1* | 6/2013 | Wei .......................... | G06F 3/011 345/156 |
| 2013/0215086 A1* | 8/2013 | Boer ...................... | G06F 3/0412 345/175 |
| 2014/0071330 A1* | 3/2014 | Zhang .................. | H04N 5/2258 348/345 |

(Continued)

*Primary Examiner* — Chineyere D Wills-Burns
(74) *Attorney, Agent, or Firm* — Ferguson Braswell Fraser Kubasta PC

(57) ABSTRACT

A processing system is provided. The processing system includes: a sensor module configured to obtain a first image including a first reflected view of an input object within a sensing region associated with an input surface; and a determination module configured to: determine a first position of the input object within the first image; and determine a distance of the input object from the input surface using the first position.

17 Claims, 10 Drawing Sheets

(56) References Cited

U.S. PATENT DOCUMENTS

2015/0002405 A1* 1/2015 Kuan ................... G06F 3/041
                                                    345/173
2015/0026646 A1* 1/2015 Ahn ................ G06K 9/00201
                                                    715/863
2015/0146029 A1* 5/2015 Venkataraman ..... H04N 13/243
                                                    13/243

* cited by examiner

3D INTERACTIVE SYSTEM

TECHNICAL FIELD

The present embodiments relate generally to electronic devices. More specifically, the present embodiments relate to an input device that utilizes one or more cameras and one or more reflective surfaces to increase a sensing region by reducing the size of blind spots. Multiple images from the one or more cameras are used to determine the position of an input object within the sensing region.

BACKGROUND

Input devices including proximity sensor devices (e.g., touchpads, touch sensor devices, etc.) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Proximity sensor devices may also be used to detect finger, styli, or pens.

Proximity sensor devices may utilize a camera to capture images of an input object within the camera's sensing region. However, if the input object is located in the camera's blind spot, the input object might not appear in the image and thus proximity sensor device might erroneously determine that no input object is present.

SUMMARY

In general, one or more embodiments relate to a processing system. The processing system comprises: a sensor module configured to obtain a first image comprising a first reflected view of an input object within a sensing region associated with an input surface; and a determination module configured to: determine a first position of the input object within the first image; and determine a distance of the input object from the input surface using the first position.

In general, one or more embodiments relate to a method for operating a processing system associated with an input surface. The method comprises: obtaining a first image comprising a first reflected view of an input object within a sensing region associated with the input surface, wherein the first image is obtained by a first camera comprising a first field of view, and wherein the first reflected view is obtained from a reflective surface within the first field of view; determining a first position of the input object within the first image; and determining a distance of the input object from the input surface using the first position.

In general, one or more embodiments relate to an input device. The input device comprises: an input surface; a first reflective surface emitting a first reflected view of an input object proximate to the input surface; a first camera comprising a first field of view and configured to generate a first image comprising the first reflected view, wherein the first reflective surface is within the first field of view; and a processing system configured to: determine a first position of the input object within the first image; and determine a distance of the input object from the input surface using the first position.

Other aspects of the embodiments will be apparent from the following description and the appended claims.

BRIEF DESCRIPTION OF DRAWINGS

The present embodiments are illustrated by way of example and are not intended to be limited by the figures of the accompanying drawings.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
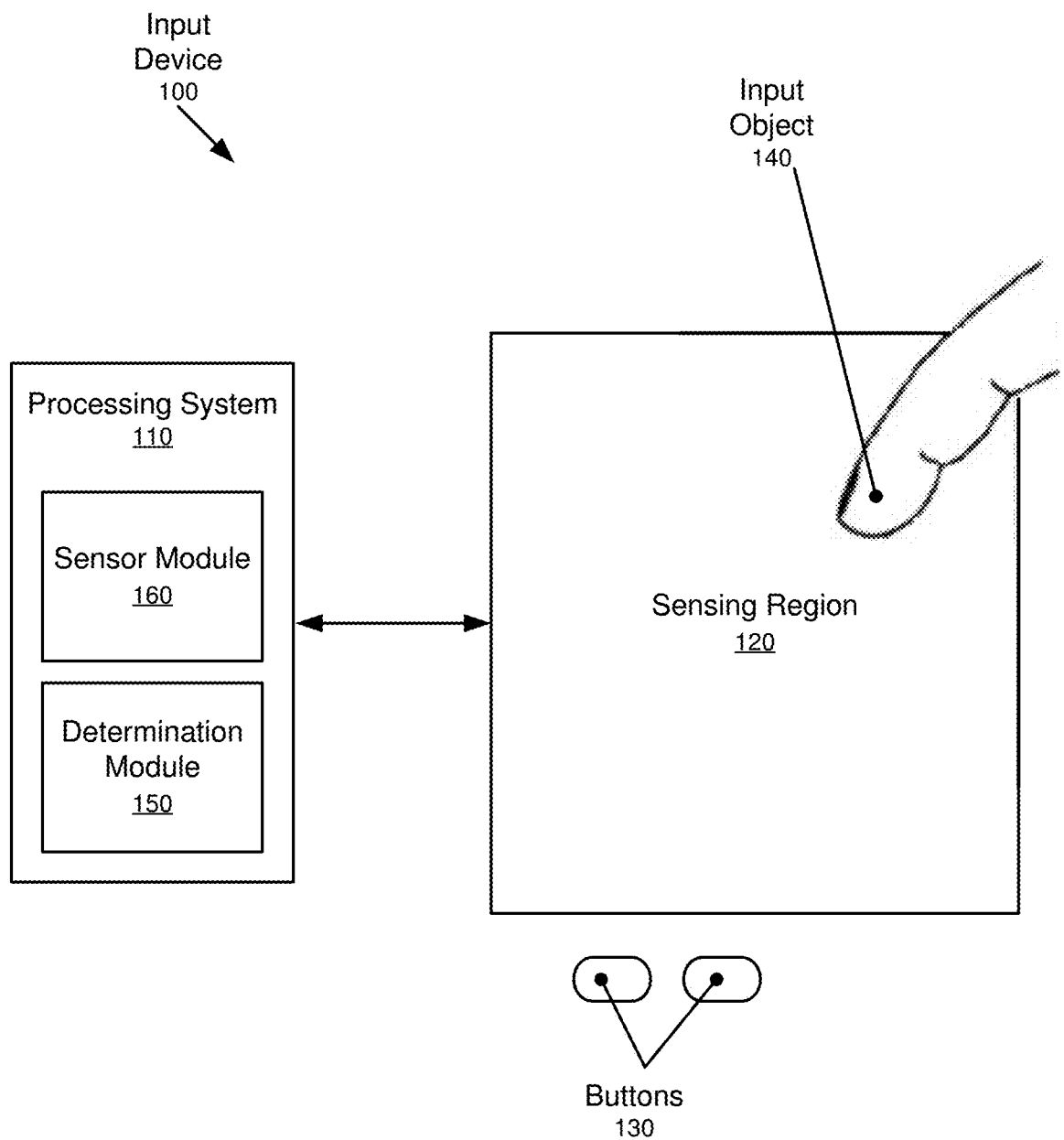
FIG. 1 shows a block diagram of an input device in accordance with one or more embodiments.

Turning now to the figures, FIG. 1 is a block diagram of an exemplary input device (100) within which the present embodiments may be implemented. The input device (100) includes a processing system (110) and a sensing region (120). The input device (100) may be configured to provide input to an electronic system (not shown for simplicity). Examples of electronic systems (or electronic devices) may include personal computers (e.g., desktop computers, laptop computers, tablet computers, netbook computers, tablets, web browsers, e-book readers, and personal digital assistants (PDAs)), composite input devices (e.g., physical keyboards, joysticks, or key switches), data input devices (e.g., remote controls and mice), data output devices (e.g., display screens and printers), remote terminals, kiosks, and video game machines (e.g., video game consoles, portable gaming devices, and the like), communication devices (e.g., cellular phones, such as smart phones), and media devices (e.g., recorders, editors, and players such as televisions, set-top boxes, music players, digital photo frames, and digital cameras). The electronic system can be a host or a slave to the input device.

In the example of FIG. 1, the input device (100) may correspond to a proximity sensor device (e.g., a "touchpad" or a "touch sensor device") configured to sense input provided by one or more input objects (140) in a sensing region (120). Example input objects (140) include styli, active pen, fingers, fingertips, and the like. The sensing region (120) may encompass any space above, around, in, and/or proximate to the input device (100) in which the input device (100) is able to detect user input (e.g., provided by one or more input objects (140)). The size, shape, and location of particular sensing region (120) (e.g., relative to the electronic system) may vary depending on actual implementations.

In some embodiments, the sensing region (120) may detect inputs involving no physical contact with any surfaces of the input device (100), contact with an input surface (e.g., a touch surface and/or screen) of the input device (100), contact with an input surface of the input device (100) coupled with some amount of applied force or pressure, and/or a combination thereof.

The input device (100) may utilize various combination of sensor components and sensing technologies to detect user input in the sensing region (120). Example sensing technologies may include capacitive, elastive, resistive, inductive, magnetic, acoustic, ultrasonic, radio frequency (RF) waves, and/or optical sensing technologies. The input device (100) may include one or more sensing elements configured to implement the various sensing technologies.

In some optical implementations of the input device system (100), one or more sensing elements are cameras (e.g., red-green-blue (RGB) cameras, infrared (IR) cameras, ultra violet (UV) cameras, etc.) that generate images of the sensing region and thus any input objects in the sensing region.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling.

In FIG. 1, a processing system (110) is shown as part of the input device (100). The processing system (110) is configured to operate the hardware of the input device (100) to detect input in the sensing region (120). The processing system (110) includes parts of or all of one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. Further still, a processing system for an optical sensor (e.g., cameras) device may include circuitry configured to obtain and process images of the sensing region. In one more embodiments, a processing system for a combined capacitance sensor device and optical sensor device may include any combination of the above described circuitry. In some embodiments, the processing system (110) also includes electronically-readable instructions, such as firmware code, software code, and/or the like.

The processing system (110) may be implemented as a set of modules that handle different functions of the processing system (110). Each module may include circuitry that is a part of the processing system (110), firmware, software, or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensory circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The sensor module (160) may include functionality to obtain images of the sensing region (120) from one or more cameras.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, and other functions. In some embodiments, the processing system (110) provides information about the input (or lack of input) to some part of the electronic system (e.g. to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no additional input components.

In some embodiments, the input device (100) includes a display screen and the sensing region (120) overlaps at least part of the display screen (e.g., the entire display screen or a portion of the display screen is touch sensitive). For example, the input device (100) may include substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may configured for both display updating and input sensing. As another example, the display screen may be operated in part or in total by the processing system (110).

It should be understood that while many embodiments are described in the context of a fully functioning apparatus, the mechanisms of the described embodiments are capable of being distributed as a program product (e.g., software) in a variety of forms. For example, the mechanisms may be implemented and distributed as a software program on information bearing media that are readable by electronic processors (e.g., non-transitory computer-readable and/or recordable/writable information bearing media that is readable by the processing system (110)). Additionally, the embodiments apply equally regardless of the particular type of medium used to carry out the distribution. For example, software instructions in the form of computer readable program code to perform embodiments may be stored, in whole or in part, temporarily or permanently, on a non-transitory computer readable storage medium. Examples of non-transitory, electronically readable media include various discs, physical memory, memory, memory sticks, memory cards, memory modules, and or any other computer readable storage medium. Electronically readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities.

While FIG. 1 shows a configuration of components, other configurations may be used without departing from the scope of the invention. For example, various components may be combined to create a single component. As another example, the functionality performed by a single component may be performed by two or more components.

Figure 2A:
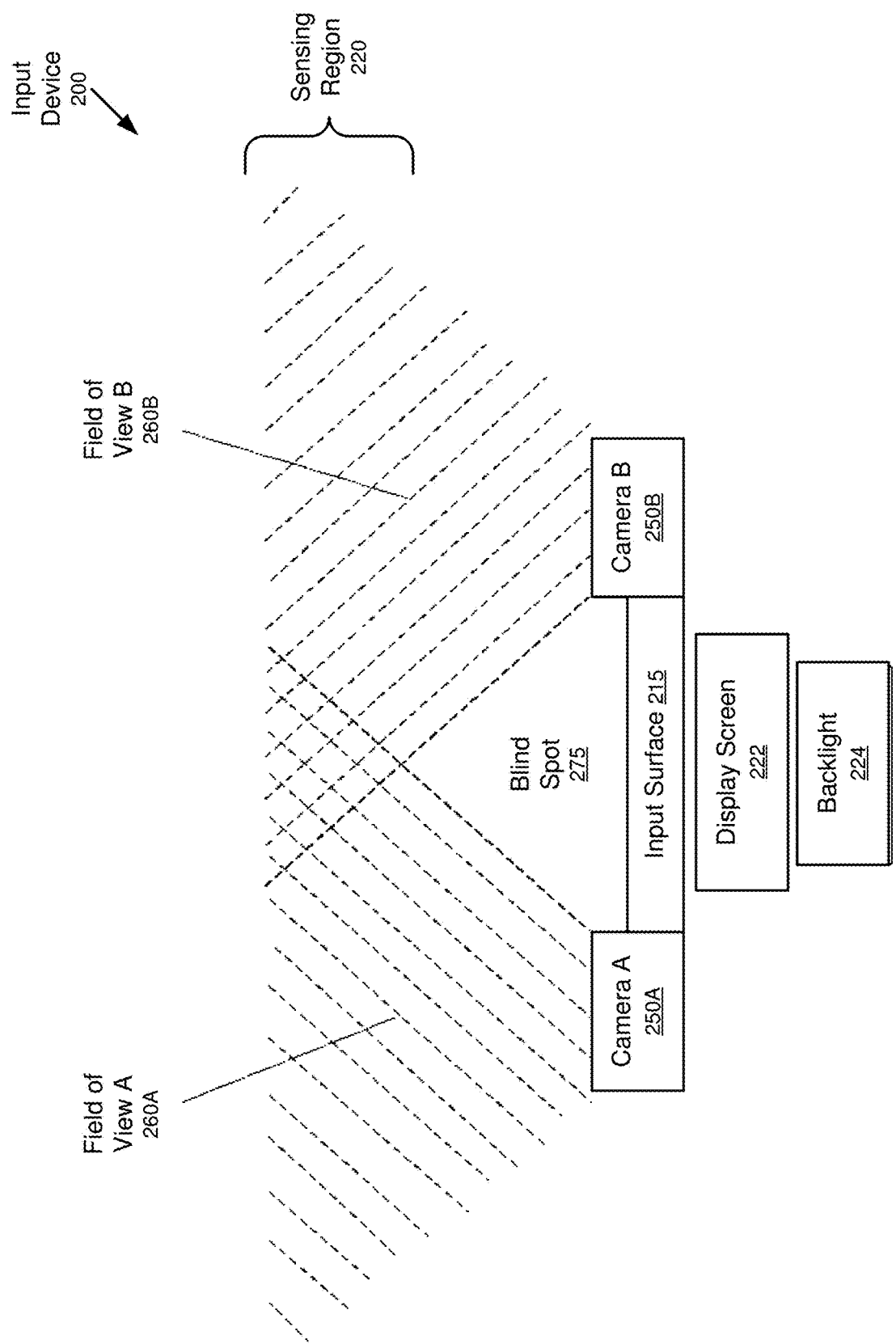
FIG. 2A shows a side-view of an input device with a sensing region in accordance with one or more embodiments.

FIG. 2A shows a side-view of an input device (200) with a sensing region (220) in accordance with one or more embodiments. The input device (200) may share some or all of the components of input device (100), discussed above in reference to FIG. 1. Moreover, sensing region (220) may be essentially the same as sensing region (120), as also discussed above in reference to FIG. 1. As shown in FIG. 2A, the input device (200) includes an input surface (215), a display screen (222), and a backlight (224). Although shown as separate components in FIG. 2A, the input surface (215), the display screen (222), and the backlight (224) may be a single component in other embodiments. The display screen (222) and/or backlight (224) are optional. When the display screen (222) and/or the backlight (224) are present, the input surface (215) may be partially or fully transparent.

In one or more embodiments, the input device (200) includes one or more cameras (e.g., Camera A (250A), Camera B (250B)). The cameras (250A, 250B) may be red-green-blue (RGB) cameras, infrared (IR) cameras, UV cameras, etc. Each camera (250A, 250B) may be placed at a corner of the input surface (215), along an edge (e.g., at the midpoint of the edge) of the input surface (215), or other suitable positions. In one or more embodiments, there may be one or multiple cameras per edge. Although FIG. 2A only shows two cameras (250A, 250B), in other embodiments any suitable number of cameras may be used.

In one or more embodiments, each camera (250A, 250B) generates one or more images of the sensing region (220). As illustrated in FIG. 2A, each camera (250A, 250B) has a field of view. Specifically, camera A (250A) has field of view A (260A), while camera B (250B) has field of view B (260B). The fields of view (260A, 260B) may partially overlap. In one or more embodiments, the fields of view (260A, 260B) do not overlap.

Those skilled in the art, having the benefit of this detailed description, will appreciate that if an input object (e.g., fingertip) is within field of view A (260A), the image generated by camera A (250A) will include a direct view of the input object within the sensing region (220). Similarly, if the input object is within field of view B (260B), the image generated by camera B (250B) will include a direct view of the input object within the sensing region (220).

In some embodiments, sensing region (220) may include a blind spot (275) caused by the location and/or field of view (260A, 260B) of each camera (250A, 250B). The blind spot (275) may be in close proximity to the input surface (215). If an input object is within the blind spot (275), and thus outside the fields of view (260A, 260B), the input object will be absent from images generated by the cameras (250A, 250B).

Figure 2B:
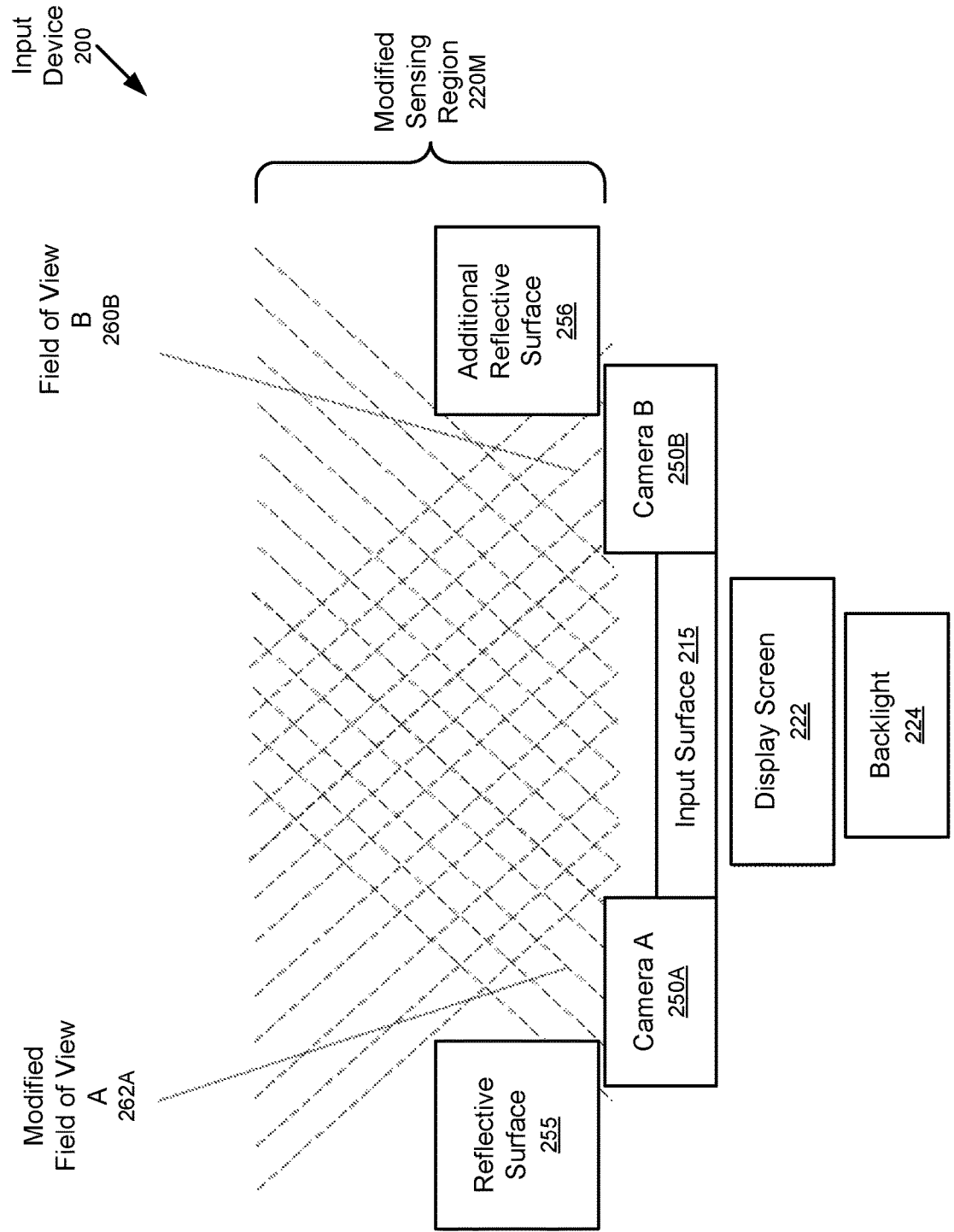
FIG. 2B shows a side-view of an input device with an expanded sensing region in accordance with one or more embodiments.

FIG. 2B shows the input device (200) with an expanded sensing region in accordance with some embodiments. The input device (200) includes a reflective surface (255) which may be attached or coupled via various means. The reflective surface (255) may be a mirror. The mirror may be of any type (e.g., plane mirror, curved mirror, etc.), material, and size/shape. The reflective surface (255) is within the field of view of one or more of the cameras (250A, 250B). Moreover, because of its placement and reflective properties, the reflective surface (255) modifies (e.g., enlarges) the field of view of one or more of the cameras (250A, 250B). For example, camera A (250A) has modified the field of view A (262A). The one or more modified field of views (262A) cover additional space proximate to the input surface (215). In other words, the one or more modified field of views (262A) effectively reduce the blind spot (275) above the input surface (215). This reduction or elimination of the blind spot (275) results in a modified (e.g., enlarged) sensing region (220M). As shown in FIG. 2B, the reflective surface (255) is associated with camera A (250A). Accordingly, one or more reflections emitted by the reflective surface (255) may be present in the images generated by camera A (250A). In one or more embodiments, the reflective surface (255) covers, or partially covers, a lens of camera A (250A).

When the input object is proximate to input surface (215), the reflective surface emits a reflected view of the input object that is within modified field of view A (262A). Accordingly, one or more images generated by camera A (250A) may include the reflected view of the input object. Each image generated by camera A (250A) may include a direct view of the input object, a reflected view of the input object, or both, depending on the orientation, size, shape, etc. of the reflective surface (255) and modified field of view A (262A). For example, if an input object is very close to input surface (215), the image generated by camera A (250A) includes only the reflected view of the input object. However, if the input object is further away from input surface (215), the image generated by camera A (250A) may include a direct view of the input object, a reflected view of the input object, or both.

In one or more embodiments, the input device (200) includes a backlight (224). If the cameras (250A, 250B) are RGB cameras, the backlight (224) may emit white light. If the cameras (250A, 250B) are IR cameras, the backlight (224) may emit IR. The radiation (e.g., white light, IR, etc.) emitted by the backlight (224) passes through the display screen (222) and the input surface (215) and illuminates the input object within the sensing region (220). Thus the backlight (224) can improve (e.g., brightens, sharpens, etc.) the directed view and/or the reflected view of the input object in the images generated by the cameras (250A, 250B).

In one or more embodiments, the input device (200) includes multiple reflective surfaces (e.g., one reflective surface per camera, multiple reflective surfaces per camera, etc.). For example, input device (200) may include the additional reflective surface (256). The additional reflective surface (256) is within the field of view of camera B (250B) and modifies the field of view of camera B (250B). Further, although FIG. 2B illustrates the use of cameras (250A, 250B) to detect input objects in the modified sensing region (220M), the input device (200) may use capacitive sensing technology in addition to or as an alternative to using the cameras (250A, 250B). For example, electrodes for capacitive sensing may be located (e.g., as a layer(s)) in the display screen (222) or the input surface (215).

Referring back to FIG. 1, the input device (100) includes a processing system (110) having a sensor module (160) and a determination module (150). The processing system (110) may be operatively coupled to the cameras (250A, 250B) and the display screen (222). The sensor module (160) may be configured to obtain images from the cameras (250A, 250B) and may preprocess the images (e.g., adjusting brightness, contrast, and/or color, detecting edge, etc.). The determination module (150) may be configured to determine positional information of the input object within the one or more obtained images, and then determine a distance of the input object from the input surface (215) using the positional information. Determining the distance may include calculating a 3D coordinate for the input object. The distance may be provided (e.g., reported) to a software application (e.g., gaming software) and trigger an event.

Figure 3:
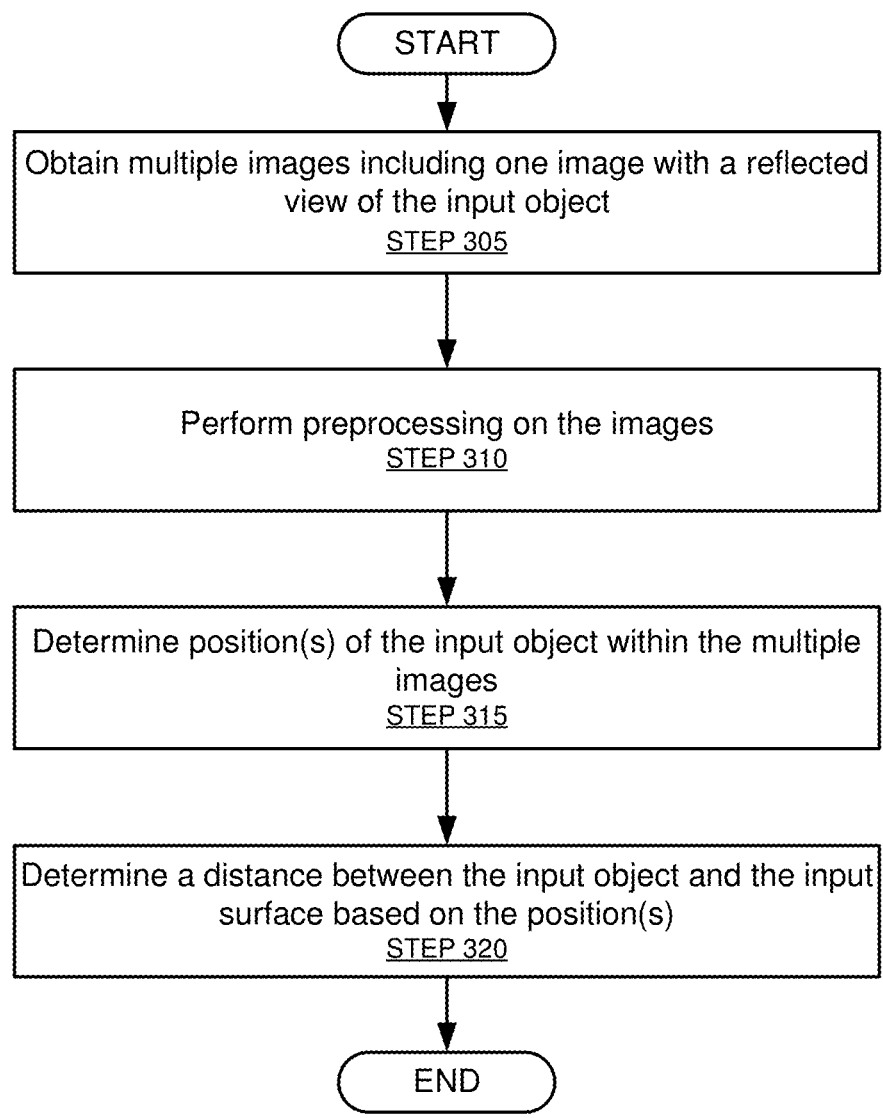
FIG. 3 shows a flowchart depicting a method for operating a processing system associated with an input surface in accordance with one or more embodiments.

FIG. 3 depicts a method for operating a processing system associated with an input surface in accordance with an embodiment. One or more of the steps shown in FIG. 3 may be performed by the components of the input device (200) shown in FIG. 2 or input device (100) shown in FIG. 1. It is to be noted that one or more of the steps shown in FIG. 3 may be omitted, repeated, performed in series or in parallel, and/or performed in a different order.

Initially, multiple images of a sensing region are obtained (STEP 305). The multiple images may be obtained by one or more cameras positioned at various locations in relation to an input surface of an input device. If an input object is close to the input surface, one or more images may include reflected views (i.e., from the reflective surface) of the input object. Additionally or alternatively, the other images may include a direct view of the input object. If an input object is further above the input surface, one or more images may include both a direct view and a reflected view of the input object.

In STEP 310, preprocessing is performed on the one or more of the images. Preprocessing may include one or more of brightness adjustment, contrast adjustment, color adjustment, edge detection, etc. Preprocessing may be performed to improve input object detection in the images (e.g., decrease false positive rate).

In STEP 315, the position(s) (e.g., coorindates) of the input object within the image(s) is determined. The position determination may include segmenting the images into different regions and identifying the position(s) of the input object in each region. The identified position(s) may include a set of coordinates (e.g., $(x_{1R}, y_{1R})$, $(x_{1D}, y_{1D})$, $(x_{2D}, y_{2D})$, ...) corresponding to the position of the input object within the images. For example, $(x_{1R}, y_{1R})$ corresponds to the position of the reflected view of the input object within image 1. Similarly, $(x_{1D}, y_{1D})$ corresponds to the position of the direct view of the input object within image 1. Further, $(x_{2D}, y_{2D})$ corresponds to the position of the direct view of the input object within image 2.

In STEP 320, a distance between the input object and the input surface is determined using the position(s) (e.g., 2D coordinates) of the input object in the image(s). In one or more embodiments, the 2D coordinates of the input object in the images will be used to calculate the actual 3D coordinates of the input object through triangulation.

Figure 4A:
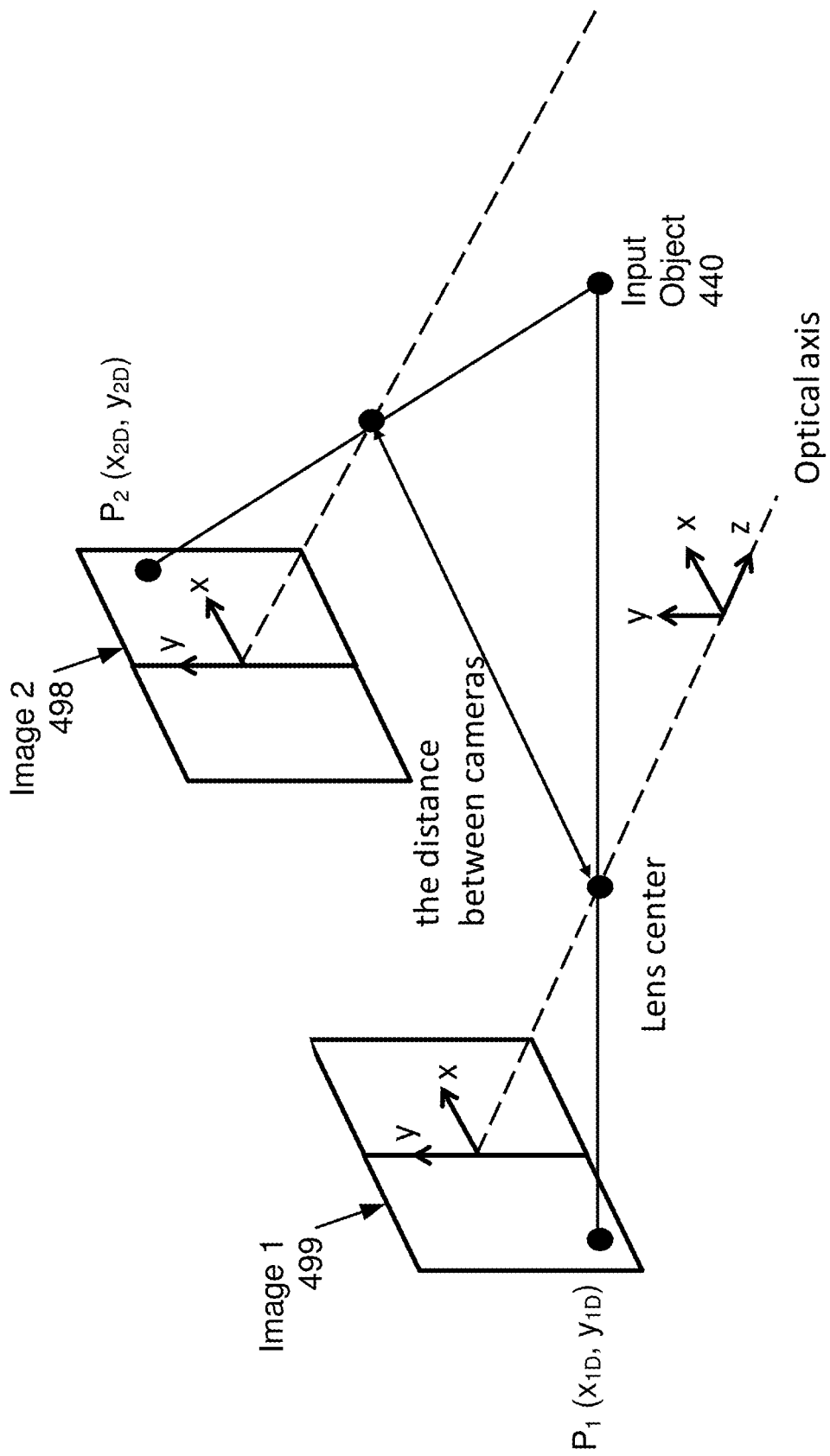
FIG. 4A, FIG. 4B, and FIG. 4C show triangulation examples in accordance with one or more embodiments.

FIG. 4A shows a triangulation example in accordance with one or more embodiments. As shown in FIG. 4A, there exists two images: image 1 (499), image 2 (498). Each image (498, 499) is obtained from a different camera. As the input object (440) is far from the input surface, both images (498, 499) have a direct view of the input object. In image 1 (499), the position of the direct view of the input object is $P_1$ $(x_{1D}, y_{1D})$. In image 2 (498), the position of the direction view of the input object is P2 $(x_{2D}, y_{2D})$. P1, P2, and the distance between the cameras may be used to calculate the 3D coordinates of the input object (440). The actual 3D coordinates of the input object (440) or just the distance between the input object and the input surface may be provided to another hardware system or software application (e.g., gaming application) to trigger an event.

Figure 4B:
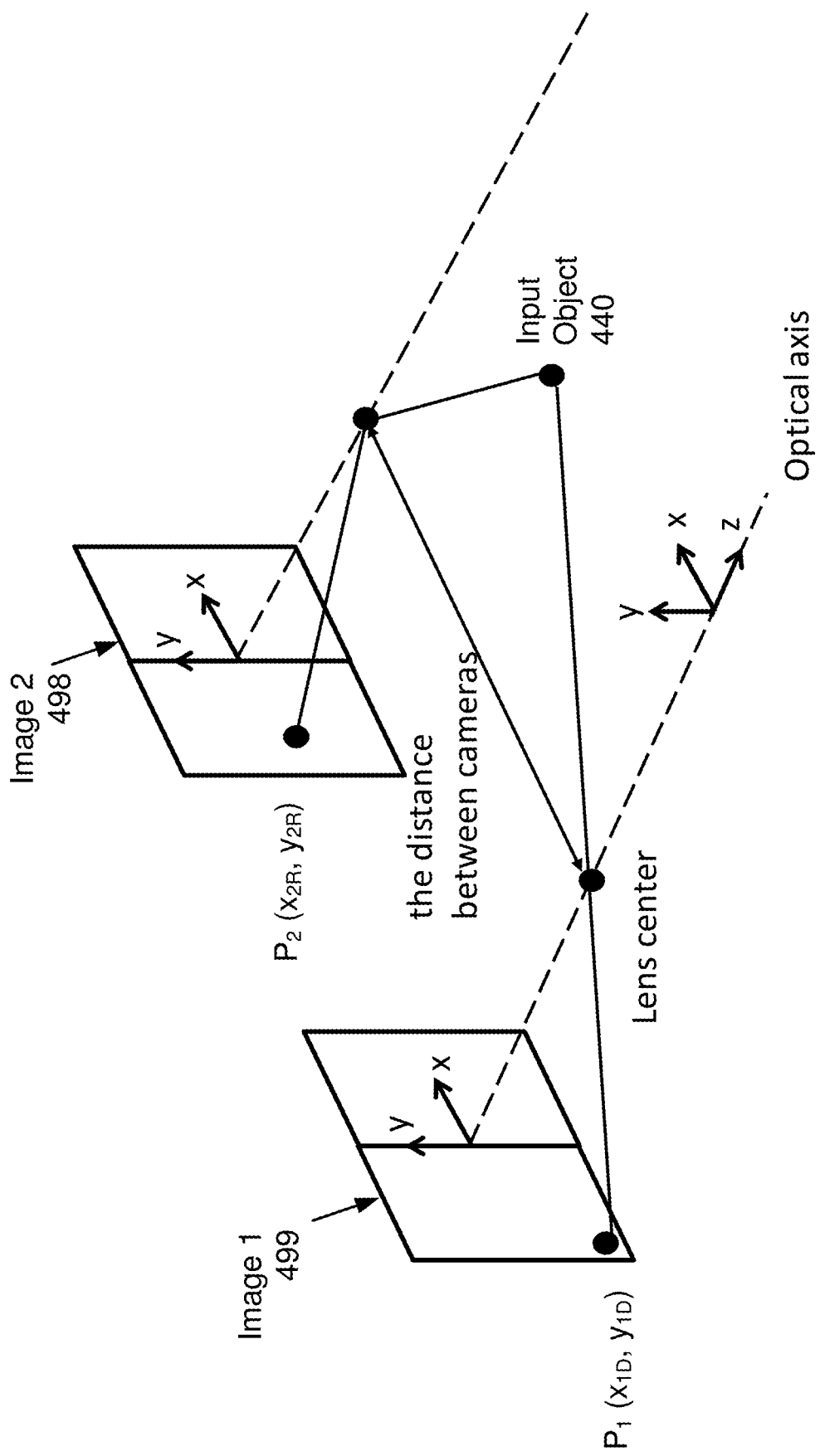

FIG. 4B shows a triangulation example in accordance with one or more embodiments. As shown in FIG. 4B, there exists two images: image 1 (499), image 2 (498). Each image (498, 499) is obtained from a different camera. As the input object (440) is closer to the input surface than in FIG. 4A, image 1 (499) includes a direct view of the input object, but image 2 (498) includes a reflected view of the input object. In image 1 (499), the position of the direct view of the input object is $P_1$ $(x_{1D}, y_{1D})$. In image 2 (498), the position of the reflected view of the input object is P2 $(x_{2R}, y_{2R})$. P1, P2, and the distance between the cameras may be used to calculate the 3D coordinates of the input object (440). The actual 3D coordinates of the input object (440) or just the distance between the input object and the input surface may be provided to another hardware system or software application (e.g., gaming application) to trigger an event.

Figure 4C:
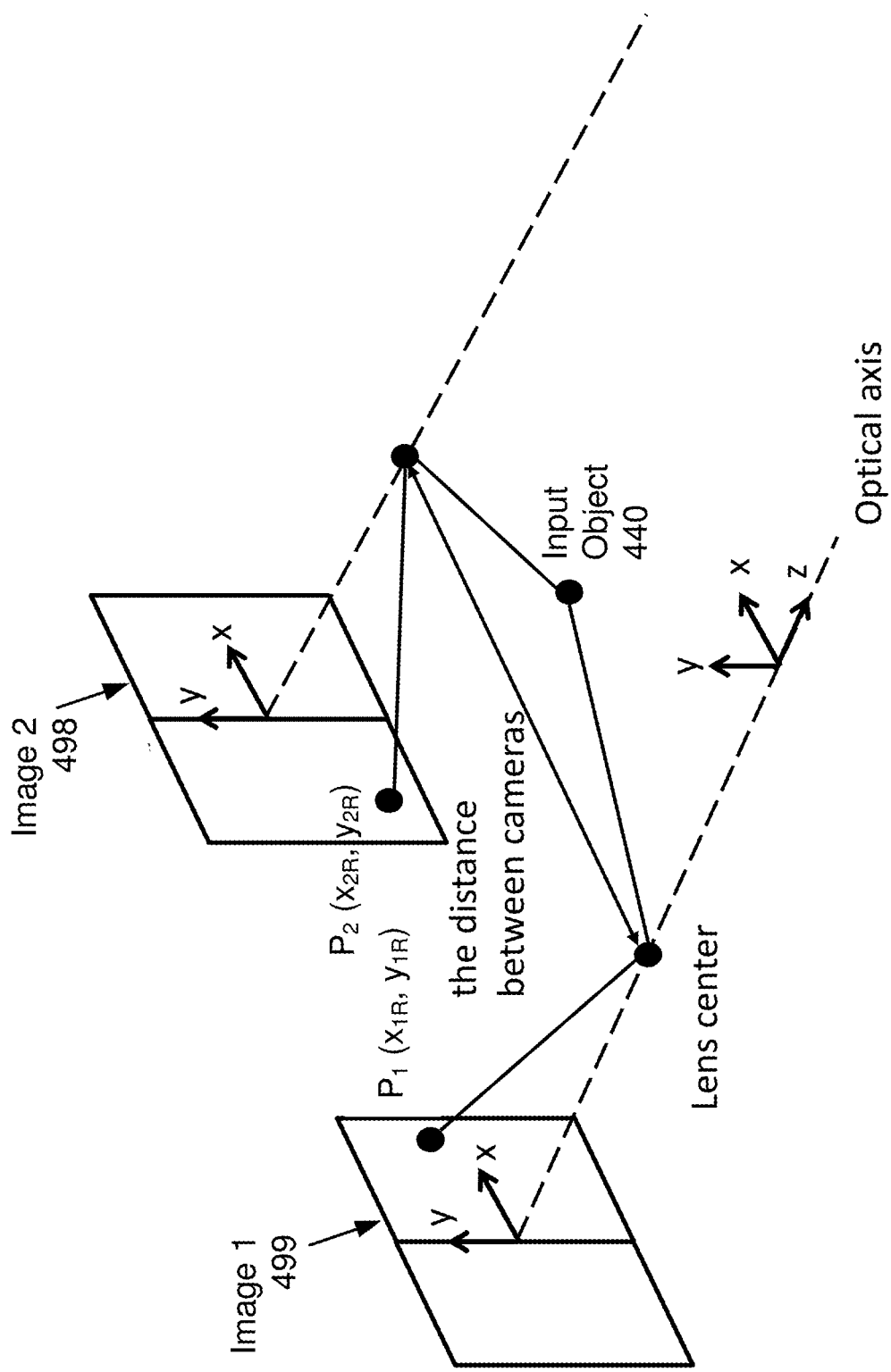

FIG. 4C shows a triangulation example in accordance with one or more embodiments. As shown in FIG. 4C, there exists two images: image 1 (499), image 2 (498). Each image is obtained from a different camera. As the input object (440) is very close to the input surface, both image 1 (499) and image 2 (498) include a reflected view of the input object (440). In image 1 (499), the position of the reflected view of the input object is $P_1$ ($x_{1R}$, $y_{1R}$). In image 2 (498), the position of the reflected view of the input object is P2 ($x_{2R}$, $y_{2R}$). P1, P2, and the distance between the cameras may be used to calculate the 3D coordinates of the input object (440). The actual 3D coordinates or just the distance between the input object and the input surface may be provided to another hardware system or software application (e.g., gaming application) to trigger an event.

Figure 5A:
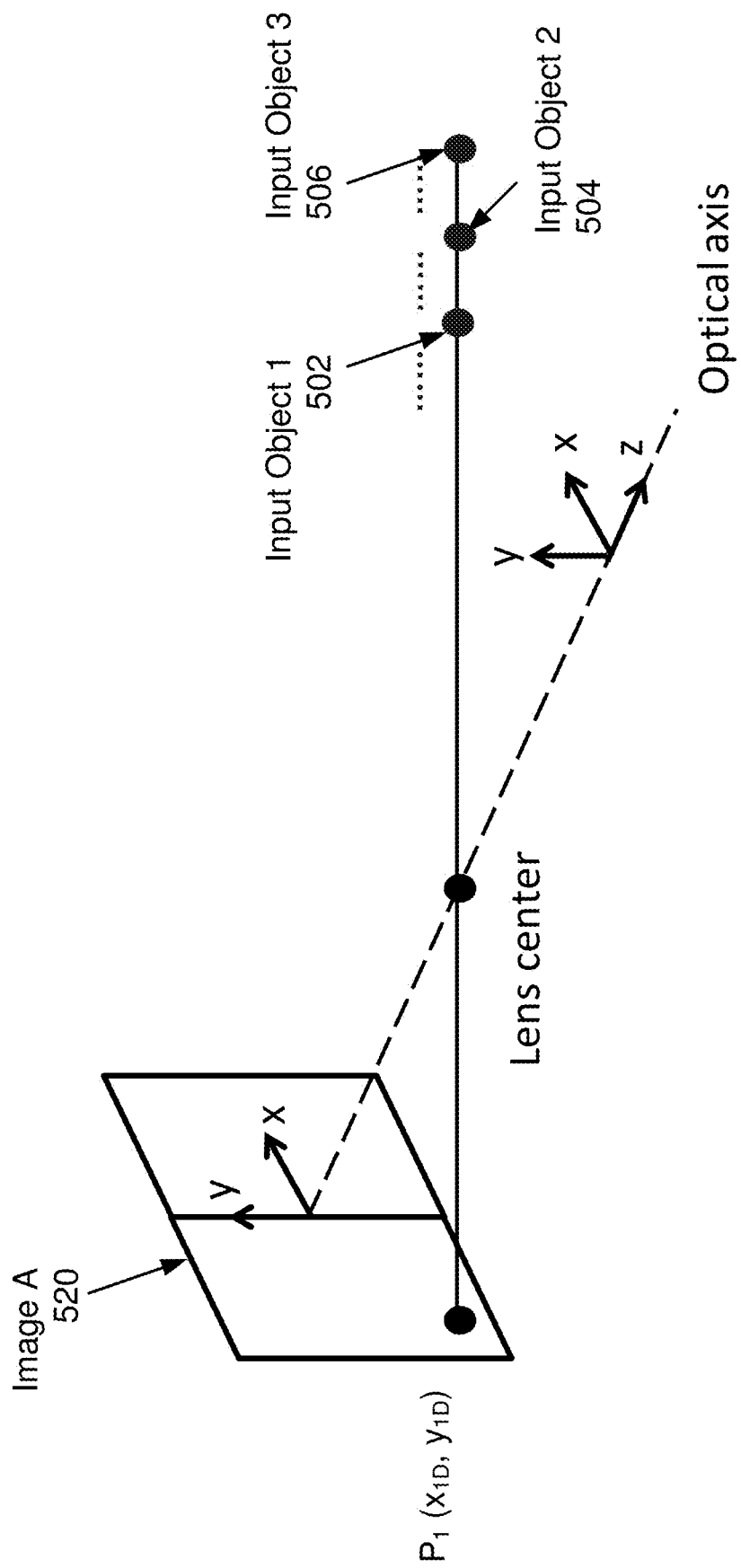
FIG. 5A, FIG. 5B, and FIG. 5C show gesture detection examples in accordance with one or more embodiments.
Figure 5B:
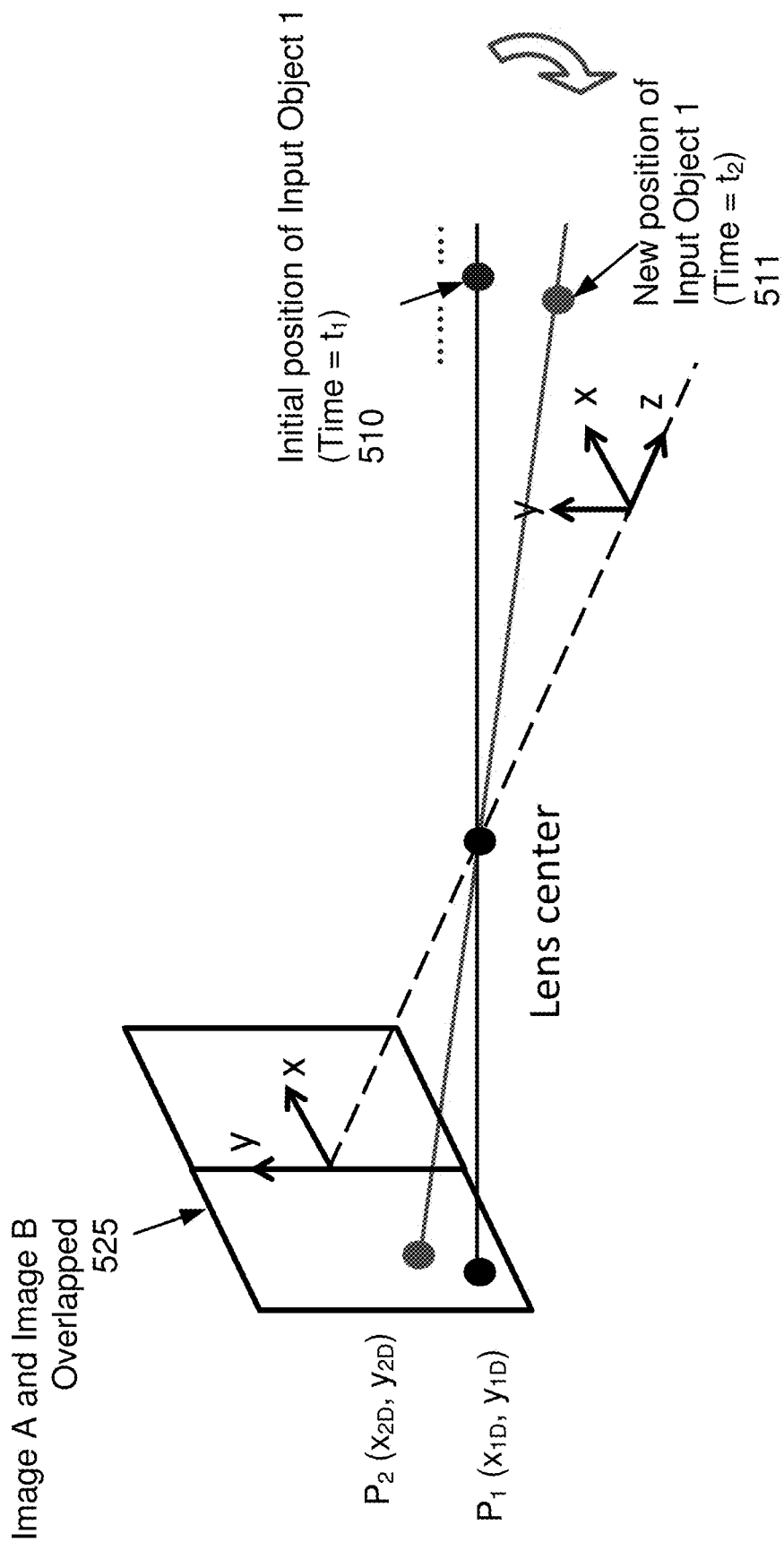
Figure 5C:
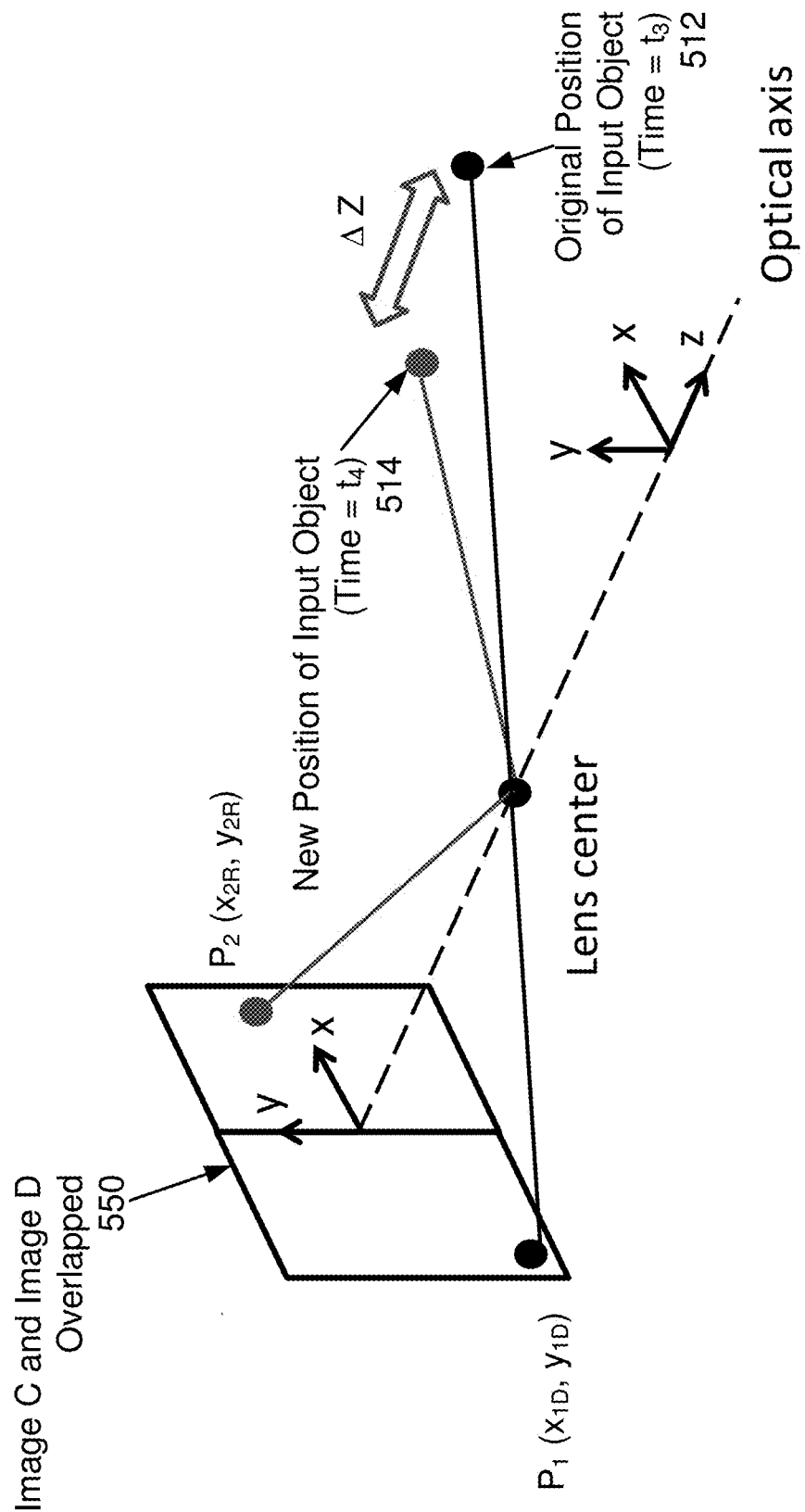

FIG. 5A, FIG. 5B, and FIG. 5C show gesture detection examples in accordance with one or more embodiments. In FIGS. 5A-5C, gesture detection is performed using multiple images generated by a single camera (e.g., camera A (250A) or camera B (250B)). Those skilled in the art, having the benefit of this detailed description, will appreciate that an image is effectively the projection of a 3D environment (e.g., sensing region) onto a 2D surface. Accordingly, multiple input objects in a sensing region might all project onto the same point within an image. For example, FIG. 5A shows three input objects: Input Object 1 (502), Input Object 2 (504), and Input Object 3 (506). All three input objects (502, 504, 506) project onto the same point (P1 ($x_{1D}$, $y_{1D}$)) within image A (520).

Now assume there is a sensing region with just Input Object 1 (502). Further, assume image A (520) is generated by a camera at time $t_1$. Further still, assume a second image (image B) (not shown) is generated by the same camera at time $t_2$ subsequent to $t_1$. Between $t_1$ and $t_2$, input object 1 (502) may have shifted within the sensing region. For example, input object 1 (502) may be a user's finger and the user may be executing a gesture. FIG. 5B shows the initial position (510) of input object 1 (502) within the sensing region at $t_1$, and the new position (511) of input object 1 (502) within the sensing region at $t_2$. In image B, the new position (511) of input object 1 (502) projects onto point P2 ($x_{2D}$, $y_{2D}$). When image A and image B are overlapped (525), both P1 and P2 are visible. The displacement between the initial position (510) and the new position (511) may be determined (i.e., calculated, measured, etc.) from P1 and P2. This displacement may be used to determine the gesture being performed by the user. For example, at least one of the displacement and the time window ($t_2$-$t_1$) may be compared to templates of known gestures to find a match.

In FIG. 5A and FIG. 5B, both image A and image B had a direct view of input object 1 (502). However, indirect views (e.g., views obtained via a reflective surface) may also be used to determine the displacement of an input object in the sensing region.

In FIG. 5C, assume an image (image C) (not shown) is generated at time $t_3$, when an input object is at original position (512) within the sensing region. Further, assume another image (image D) (not shown) is generated by the same camera at time $t_4$, when the input object is at a new position (514) within the sensing region. An overlap of image C and image D (550) is shown in FIG. 5C. When the input object is at the original position (512), it projects to point P1 ($x_{1D}$, $y_{1D}$). In other words, image C has a direct view of the input object at its original position (512) within the sensing region. When the input object is at its new position (514), it projects to point P2 ($x_{2R}$, $y_{2R}$) within the sensing region. In other words, image D has a reflected view of the input object at its new position (514). The displacement between the initial position (512) and the new position (514) may be determined (i.e., calculated, measure, etc.) from P1 and P2. The displacement may include movement of the input object towards or away from the input surface. This displacement may be used to determine the gesture being performed by the user. For example, at least one of the displacement and the time window ($t_4$-$t_3$) may be compared to templates of known gestures to find a match.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A processing system, comprising:
    a sensor module configured to obtain a first image comprising a first reflected view of an input object within a sensing region associated with an input surface,
        wherein the first image is obtained from a first camera comprising a first field of view,
        wherein the first reflected view is obtained from a first reflective surface within the first field of view of the first camera,
        wherein the first reflective surface is separate from the input surface and separate from the input object, and
        wherein the first reflective surface partially covers a lens of the first camera and is at least partially facing the first camera; and
    a determination module configured to:
        determine a first position of the input object within the first image; and
        determine a distance of the input object from the input surface using the first position.

2. The processing system of claim 1, wherein:
    the sensor module is further configured to obtain, from a second camera comprising a second field of view, a second image comprising a second reflected view of the input object;
    the second reflected view is obtained from a second reflective surface within the second field of view of the second camera;
    the second reflective surface is separate from the input surface and separate from the input object;
    the determination module is further configured to determine, within the second image, a second position of the input object corresponding to the second reflected view; and
    the distance is further determined using the second position.

3. The processing system of claim 1, wherein:
the sensor module is further configured to obtain, from a second camera comprising a second field of view, a second image comprising a direct view of the input object;
the determination module is further configured to determine, within the second image, a second position of the input object corresponding to the direct view; and
the distance is further determined using the second position.

4. The processing system of claim 1, wherein the first camera captures infrared (IR) radiation emitted from a backlight passing through a display screen, the display screen capable of displaying a visual interface, and wherein the input surface is the display screen.

5. The processing system of claim 1, wherein:
the sensor module is further configured to:
obtain, from the first camera, a second image comprising a direct view of the input object; and
the determination module is further configured to:
determine, within the second image, a second position of the input object corresponding to the direct view; and
determine a displacement of the input object in the sensing region using the first position and the second position.

6. A method for operating a processing system associated with an input surface, comprising:
obtaining a first image comprising a first reflected view of an input object within a sensing region associated with the input surface,
wherein the first image is obtained by a first camera comprising a first field of view,
wherein the first reflected view is obtained from a first reflective surface within the first field of view of the first camera,
wherein the first reflective surface is separate from the input surface and separate from the input object, and
wherein the first reflective surface partially covers a lens of the first camera and is at least partially facing the first camera;
determining a first position of the input object within the first image; and
determining a distance of the input object from the input surface using the first position.

7. The method of claim 6, further comprising:
obtaining, from a second camera comprising a second field of view, a second image comprising a second reflected view of the input object,
wherein the second reflected view is obtained from a second reflective surface within the second field of view of the second camera, and
wherein the second reflective surface is separate from the input surface and separate from the input object; and
determining, within the second image, a second position of the input object corresponding to the second reflected view,
wherein the distance is determined using the second position.

8. The method of claim 6, further comprising:
obtaining, from a second camera comprising a second field of view, a second image comprising a direct view of the input object; and
determining, within the second image, a second position of the input object corresponding to the direct view, wherein the distance is determined using the second position.

9. The method of claim 8, wherein determining the distance comprises executing a triangulation using the first position and the second position.

10. The method of claim 6, wherein the first camera captures infrared (IR) radiation emitted from a backlight passing through a display screen, the display screen capable of displaying a visual interface, and wherein the input surface is the display screen.

11. The method of claim 6, further comprising:
obtaining, from the first camera, a second image comprising a direct view of the input object;
determining, within the second image, a second position of the input object corresponding to the direct view; and
determining a displacement of the input object in the sensing region using the first position and the second position.

12. The method of claim 11, further comprising:
determining, using the displacement, a gesture performed by a user, wherein the input object is a finger of the user.

13. An input device, comprising:
an input surface;
a first reflective surface emitting a first reflected view of an input object proximate to the input surface,
wherein the first reflective surface is separate from the input surface and separate from the input object;
a first camera comprising a first field of view and configured to generate a first image comprising the first reflected view, wherein the first reflective surface is within the first field of view, and wherein the first reflective surface partially covers a lens of the first camera and is at least partially facing the first camera; and
a processing system configured to:
determine a first position of the input object within the first image; and
determine a distance of the input object from the input surface using the first position.

14. The input device of claim 13, further comprising:
a second reflective surface emitting a second reflected view of the input object; and
a second camera comprising a second field of view and configured to generate a second image comprising the second reflected view, wherein the second reflective surface is within the second field of view,
wherein the processing system is further configured to determine, within the second image, a second position of the input object corresponding to the second reflected view, and
wherein the distance is further determined using the second position.

15. The input device of claim 13, further comprising:
a second camera configured to generate a second image comprising a direct view of the input object,
wherein the processing system is further configured to determine, within the second image, a second position of the input object corresponding to the direct view, and
wherein the distance is further determined using the second position.

16. The input device of claim 13, wherein the first camera captures infrared (IR) radiation emitted from a backlight passing through a display screen, the display screen capable of displaying a visual interface, and wherein the input surface is the display screen.

17. The input device of claim 13, wherein the processing system is further configured to:

obtain, from the first camera, a second image comprising a direct view of the input object;
determine, within the second image, a second position of the input object corresponding to the direct view; and
determine a displacement of the input object within the sensing region using the first position and the second position.

* * * * *